June 30, 1931.  R. PUDELKO  1,812,371
INDUCTION METER
Filed March 10, 1926   2 Sheets-Sheet 1
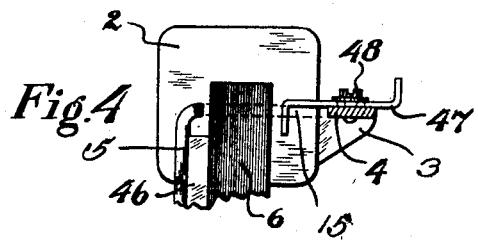
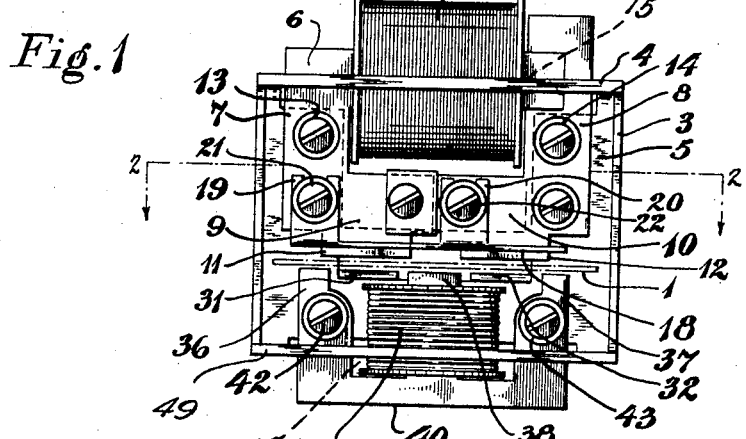
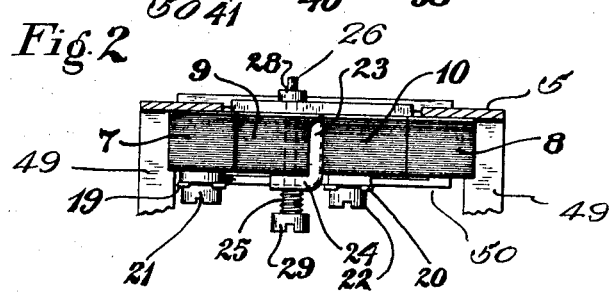
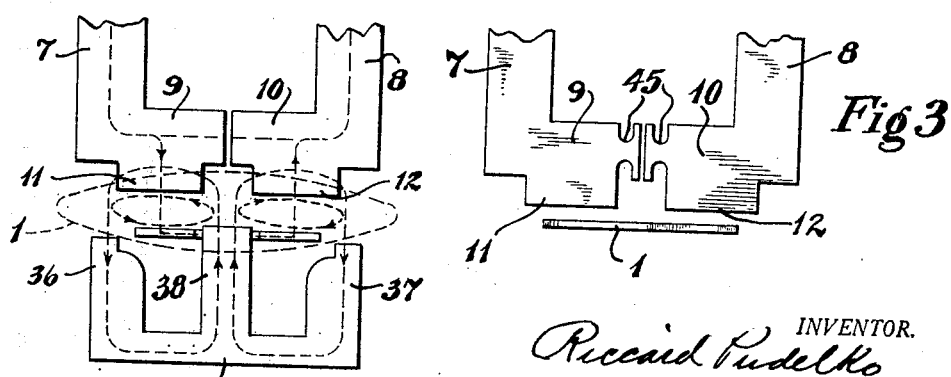
INVENTOR.
Riccard Pudelko
BY John D. Morgan
ATTORNEYS.

June 30, 1931. R. PUDELKO 1,812,371
INDUCTION METER
Filed March 10, 1926 2 Sheets-Sheet 2
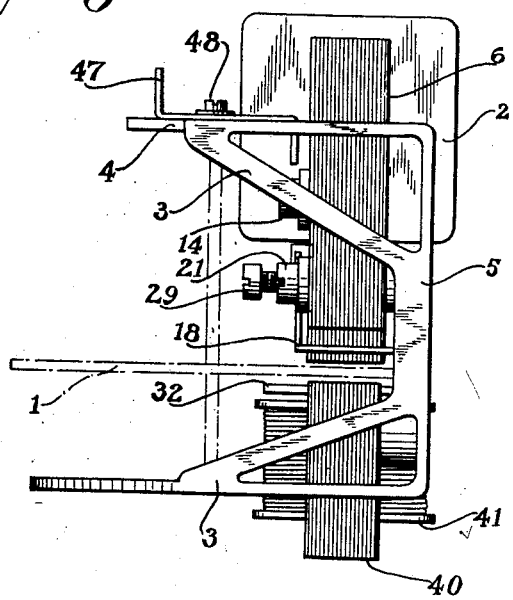
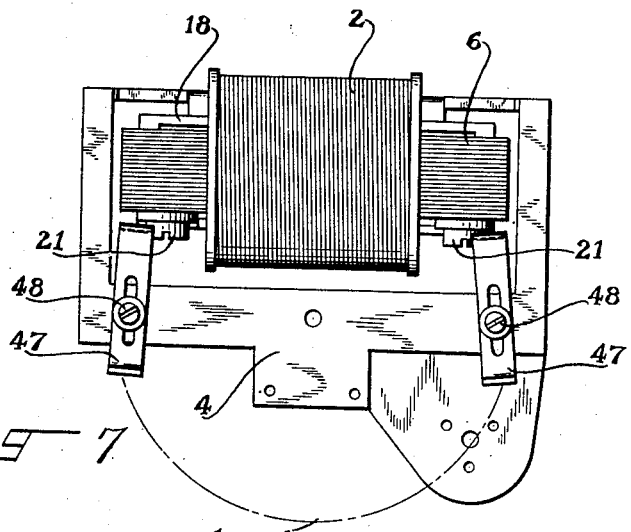
INVENTOR.
Ricard Pudelko
BY John D. Morgan
ATTORNEY Patented June 30, 1931

1,812,371

UNITED STATES PATENT OFFICE

RICCARD PUDELKO, OF ZUG, SWITZERLAND, ASSIGNOR TO LANDIS & GYR, A.-G., A JOINT STOCK COMPANY OF SWITZERLAND

INDUCTION METER

Application filed March 10, 1926, Serial No. 93,609, and in Switzerland March 11, 1925.

The invention relates to novel and useful induction meters for electric currents, and more especially to a novel and useful construction and arrangement of the pressure core and coil and current core and coil, and the cooperating instrumentalities, in such meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a front elevation of a meter mechanism embodying my invention;

Fig. 2 is a transverse, horizontal section on the line 2—2 of Fig. 1 with certain of the lower parts omitted;

Fig. 3 is a fragmentary diagrammatic view, showing a modified form of the pressure core; and Fig. 4 is a fragmentary vertical section, taken at the left-hand upper corner of Fig. 1 showing a modification of certain parts;

Fig. 5 is a diagram of the active fluxes in the fields of the current and pressure coils.

Figure 6 is a side elevation taken from the right of Figure 1; and

Figure 7 is a plan of the embodiment shown in Figure 1.

The invention is directed to providing a novel structure and arrangement of the pressure coil and core, and the current coil and core, and of the cooperating devices, and therewith and thereby a novel coaction of the respective magnetic fluxes in actuating and controlling the meter disc, and thereby the determination and measurement of the current and its characteristics; and to further providing meter actuating and controlling means with improved adjustments for varying conditions of the current, and a compact, accessible and reliable mechanism.

Referring now in detail to the present preferred embodiment of the invention, illustrated by way of example in the accompanying drawings, the meter disc 1 is shown in dot and dash line, the details of this mechanism, and also the disc shaft and appurtenant mechanism, being omitted for the sake of clearness. So far as concerns the present invention, these may be of any known or suitable form, as may be found desirable or expedient.

Referring now to the meter actuating and controlling devices in the pressure circuit, a pressure coil 2 is provided, shown, with its axis arranged horizontally, at the upper part of the supporting frame 3 for the meter mechanism. The coil is positioned in an aperture 15 formed both in the upper horizontal part 4, and the upper end of the vertical intermediate part 5 of the frame. The pressure core 6 at either end of the coil 2, is provided with respective extensions 7 and 8, extending substantially at right angles from the part 6 toward the meter disc 1. The respective ends of these extensions 7 and 8 are formed into further angled portions 9 and 10, extending toward each other, leaving a narrow air gap between. This air gap is preferably on the central axis of the entire meter mechanism, and especially with respect to the system of poles. Formed on the extensions 9 and 10, respectively, are pole pieces 11 and 12, extending from the side thereof, toward and into close proximity with one face of the meter disc 1. These pole pieces are spaced apart from each other, and are preferably in a definite relation to the poles of the current coil core, as will be later described. The core and coil are preferably supported on the meter frame by suitable means, such as screws 13 and 14. It will be understood that the position of the pressure coil and the particular shape of the core may be widely varied, so far as concerns many features of the invention.

Phase compensating devices are provided, which in certain respects may be of any desired form, but according to certain features of the invention, devices of this character are applied at the air gap, between the core ends 9 and 10, and also to the pole pieces 11 and 12.

The phase compensating devices applied to the poles pieces 11 and 12, as embodied, comprise a metal plate 18, preferably of copper, having apertures therein through which the pole pieces project, the plate surrounding the pole pieces. This plate is adjustable longitudinally of the pole pieces, and for this purpose it is provided with angularly-extending, slotted, supporting projections 19 and 20, screws 21 and 22 projecting through the slots, and being screwed into the respective parts of the core, thereby providing the necessary support and adjustment of position for the plate 18.

The phase compensating device interposed in the air gap between the two ends of the core, comprises an angular plate 23, preferably of copper, and having a portion thereof extending into the air gap, and an angled portion thereof extending in front of one end of the core. This portion is connected to a screw device, whereby the plate may be advanced farther into, or retracted from, the air gap as desired, to control accurately the motive part of the pressure field, and the pressure producing it. The plate 23, as shown, is also conveniently provided with a top flange. In the positioning means for plate 23, as shown in Fig. 2, the angled part 24 of the plate is threaded on the screw-thread 25, the forward end 26 of the device being unthreaded and rotatably mounted in an aperture extending through the core, and provided with a retaining washer and pin 28. The device has a slotted turning head 29. The particular form of this device may be varied as found convenient or desired.

According to certain features of the invention, a plurality of counter poles are provided on the opposite side of the meter disc 1 from the poles 11 and 12 of the pressure core, and as shown, a counter pole 31 is provided opposite the pole 11 and a counter pole 32 opposite the pole 12. These may be conveniently formed integral with the meter frame. They are also in a preferred desired relationship with respect to the poles of the current core as will be later described.

Referring now to the embodied form of the current coil and core, a core is provided having three parallelly-arranged parts or poles 36, 37 and 38, integral with or united by an angularly-arranged part 40. A current coil 41 is wound on the pole 38, the three parts or poles being spaced apart, side by side, and projecting into close proximity to the opposite side of the meter disc 1 from the poles of the pressure core. The coil and core are conveniently mounted in an aperture 50 in the vertical reach 5 and horizontal bottom reach 49 of the meter frame, the core being secured to the frame by screws 42 and 43.

In the preferred embodiment and arrangement the pole pieces 11 and 12 of the pressure core are substantially of a size or diameter approximately equal to the gap between the parts or pole pieces of the current core, although these dimensions may be varied, and the poles 11 and 12 are positioned approximately opposite these gaps. The counter poles 31 and 32 are positioned in the gaps between the poles of the current core.

In Fig. 3 is shown a modification of the ends of the pressure core at the air gap, designed to render the device more fully immune against possible fluctuations in the voltage. This is done, as embodied, by reducing the cross section of the core ends near the air gap, as shown at 45, thereby effecting a greater degree of magnetic saturation of the iron.

In Fig. 4 there is shown a modified form of adjustable phase compensating devices. In this form the pressure coil and core are mounted with insulating washers or spacing members 46 interposed between the core and the frame. This mechanism comprises one, or a plurality, of metal plates 47 mounted on the upper reach 4 of the frame, and projecting toward the core 6, at either side of the coil 2. These plates 47 have a screw-and-slot adjustment 48 on the frame, whereby they can be moved toward or from the core as may be desired.

Through these parts 47 the main resistance of the shunt path to the pressure core, which is closed by the frame, can be regulated so that the symmetry of the lines of force which is obtained by the arrangement of the air gap in the longitudinal middle line of the driving system, i. e., opposite the middle of the pressure coil, can be distorted and thereby the forward or the backward rotational forces exerted on the disc can be changed, or modified, or regulated with respect to each other.

In Fig. 5 there is shown, diagrammatically and approximately, the direction of the active fluxes for a certain moment of operation. The active pressure flux passes through the meter disc twice, the first time in the direction from above the disc downwardly, and the second time from below the disc upwardly. The active series flux, running through the three-armed current core, passes through the disc from the middle arm of the current core in an upward direction. The series flux then splits, and the two parts pass through the disc, in the neighborhood of the respective outer arms of the current core, from above in a downward direction.

To consider the torque formation, I indicate the direction of the eddy currents, which are produced by the two active pressure fluxes. It may be assumed that the direction of the eddy current which is produced by the active pressure flux on the left, is counterclock-wise, looked at from above. Then the active pressure flux on the right will produce an eddy current, the direction of which is opposite or clock-wise. From the foregoing it follows that the two eddy currents created by the two active pressure fluxes passing through the meter disc must produce, together with the active series flux, passing through the disc intermediately of the pressure fluxes, an identical torque.

Considering now the coaction of the eddy currents with the two series fluxes at either side, it appears that the direction of the eddy currents is opposite, and also the direction of the fluxes is opposite. The direction of the torques thereby created is consequently the same as the direction of the other torques.

It will be clear that through this novel and efficient creation and use of the active fluxes and the eddy currents, a relatively large torque is obtained. Through this core arrangement, a proportionately very small meter can be constructed; and notwithstanding the small dimensions it is possible to maintain a proportionally high torque, which is due to the advantageous use made of the coaction of active fluxes.

The various regulating and compensating devices, as described or in equivalent form, effect an accurate and uniform metering and registering of the current values, facilitate the assembling, testing and calibration of the meter, and increase the properties of the meter as to sustained accuracy of performance under varying operating conditions. In addition, a mechanism is provided, through the employment and cooperation of the main features of my invention, which is very symmetrical, compact, and accessible.

From all the foregoing it will be understood that a mechanism has been provided embodying the inventive features and resulting advantages set forth, together with others; and that changes may be made from the exact steps and structures described as by preferable procedure and embodiment, without departing from the principles of the invention and without sacrificing its chief advantages.

What I claim is:—

1. An induction meter including in combination a disc, and driving means therefor comprising a pressure coil, a pressure core having pole pieces of opposite sign in close proximity to said disc and also a pair of pole pieces constituting a magnetic shunt circuit, and a counter pole and a series coil and core on the opposite side of said disc.

2. An induction meter including in combination a disc and driving means therefor comprising a pressure coil and core having a pair of pole pieces of opposite sign in proximity to one face of the disc and also another pair of pole pieces constituting a shunt magnetic circuit and being medianly symmetrically positioned with respect to the pressure coil and core, and a current coil on the opposite side of the disc having a core with three pole pieces of alternate signs and symmetrically disposed with respect to the devices of the pressure circuit and two counter poles on the same side of the disc as the current coil and core.

3. An induction meter including in combination a meter disc, a meter frame having a flat portion intermediate its sides and a horizontal part with a common aperture in said parts, a disc driving coil in said aperture and the core therefor fixed to said frame.

4. An induction meter including in combination a meter disc, a meter frame having a flat part intermediate its sides, and horizontal parts at either end of said intermediate part, there being apertures at the junctures of the intermediate part and horizontal parts extending thereinto, a pressure coil extending into one of said apertures, and a series coil extending into the other of said apertures, and cores for the coils fastened to said frame.

5. An induction meter including in combination a meter disc, a meter frame having a substantially flat intermediate portion between its sides and horizontal top and bottom reaches provided with apertures extending into the intermediate portion of the frame, a pressure coil and core, and a current coil and core, said coils and cores being mounted within said frame and projecting through the apertures in said frame whereby the bulk of the meter is reduced.

6. An induction meter including in combination a meter disc, a meter frame having a substantially flat intermediate portion between its sides and horizontal top and bottom reaches provided with apertures extending into the intermediate portion of the frame, a pressure coil and core, and a current coil and core, said coils and cores being mounted within said frame and at least one of said coils projecting through the apertures in said frame whereby the bulk of the meter is reduced.

7. An induction meter including in combination a meter frame on which the meter disc is rotatably mounted, a pressure coil, a current coil, cores for said coils, said coils and cores being supported within the frame and projecting through apertures in the frame, the pressure coil being disposed parallel to the disc.

8. An induction meter including in combination an apertured meter frame, pressure and current coils and cores mounted within said frame, the pressure coil and current core projecting through the apertures in the meter frame permitting a compact arrangement of the coils and cores.

9. In an induction meter having in combination a meter disc, current and voltage coils and cores for driving said disc, a frame on which said cores are mounted and means at each side of said frame for variably distorting the symmetry of the magnetic field produced by the current flowing in the coils and thereby modifying the torque on the disc.

10. In an induction meter having in combination a meter disc, current and voltage coils and cores for driving said disc, a frame on which said cores are mounted and variably positionable plates at each side of said frame for variably distorting the symmetry of the magnetic field produced by the current flowing in the coils and thereby modifying the torque on the disc.

11. In an induction meter having a meter disc, voltage and current coils and cores for driving the disc, the combination of a frame on which the coils and cores are mounted and a pair of plates secured to the frame and individually movable toward and from the voltage core for distorting the symmetry of the lines of force produced by the magnetic flux.

12. An induction meter including in combination a disc, and means for moving and controlling the disc, comprising a pressure coil and a pressure core, a frame completing the shunt path from the coil and core, and phase displacement devices at either side of the coil and controlling the symmetry of the lines of force obtained by the air gap to regulate the forward and backward rotational forces on the disc.

In testimony whereof, I have signed my name to this specification.

RICCARD PUDELKO.